Patented Jan. 27, 1942

2,271,503

UNITED STATES PATENT OFFICE 2,271,503

PROCESS FOR MANUFACTURE OF DERIVATIVES OF 2-METHYL-4-AMINO-PYRIMIDINE

Heinz Moritz Wuest, Arlesheim, near Basel, and Max Hoffer, Basel, Switzerland, assignors to Hoffmann-La Roche, Inc., Nutley, N. J., a corporation of New Jersey No Drawing. Application December 27, 1940, Serial No. 371,986. In Switzerland March 28, 1940

9 Claims. (Cl. 260—251)

Derivatives of 2-methyl-4-amino-pyrimidine, e. g., 2-methyl-4-amino-5-cyanopyrimidine, are obtained by condensation of ethoxy-methylene-malonitrile and acetamidine (Zeitschrift für physiologische Chemie 242 [1936], page 95), or by condensation of amino-methylene-malonitrile with acetimino-ether. In both processes acetamidine-hydrochloride or acetimino-ether-hydrochloride are used from which the bases, which are particularly unstable towards water, must be liberated in order to carry out the condensation. It is necessary to apply precautionary measures, such as exclusion of moisture.

It has now been found that the condensation of thioacetamide with amino-methylene-nitriles even in presence of aqueous alkalis readily produces derivatives of 2-methyl-4-amino-pyrimidine in good yield.

It does not appear from the literature that the synthesis of derivatives of 2-methyl-4-amino-pyrimidine could be carried out in such a manner, for no example is known according to which a pyrimidine can be obtained from a thio-amide by reaction with an aminomethylene compound.

It is probable that the alkali compound of amino-methylene-nitrile (I) is formed as an intermediate in this reaction and that it reacts with thioacetamide (II) with elimination of alkali-hydrosulphide to form a condensation product (III) which as such or in its tautomeric form (IV) is spontaneously isomerised with ring closure to 2-methyl-4-amino-pyrimidine (V) or (VI). The following formulae illustrate the procedure:

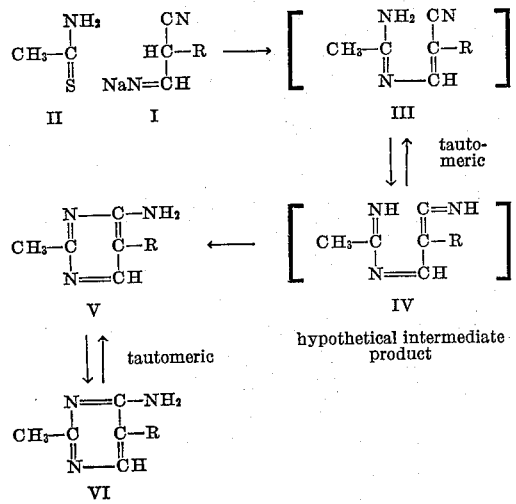

The 2-methyl-4-amino-pyrimidines are intermediate products for the synthesis of valuable medicinal agents.

Example 1

23 parts by weight of sodium are dissolved in 500 parts by volume of alcohol and 93 parts by weight of amino-methylene-malonitrile added at a temperature of 40–50° C. As a rule the sodium compound of amino-methylene-malonitrile separates in a crystalline form. 75 parts by weight of thioacetamide are now added and the product heated for 10 minutes to 60–70° C. Thereby the sodium compound of amino-methylene-malonitrile goes into solution and the separation of 2-methyl-4-amino-5-cyanopyrimidine soon sets in. The product is allowed to cool and left to stand at 20° C. for 12 hours, whereupon the precipitate of the reaction product fills the receptacle as a thick crystalline mass. The product is sucked off and washed with water. For the purpose of purification the product can be dissolved in dilute hydrochloric acid and precipitated by the addition of ammonia or recrystallised from methanol. The melting point lies at 249° C.; the picrate melts at 209° C.

Example 2

93 parts by weight of amino-methylene-malonitrile are stirred into 400 parts by volume of 2.5-n aqueous potassium hydroxide and a further 75 parts by weight of thioacetamide brought into the paste. The mixture cools spontaneously to a considerable extent. The product is warmed to 20–30° C. while stirring, then stirred for 4 hours at this temperature and finally for one hour at 60° C. After cooling, the crystalline mass of the resulting 2-methyl-4-amino-5-cyano-pyrimidine is sucked off and washed with water.

Example 3

93 parts by weight of amino-methylene-malonitrile and 75 parts by weight of thioacetamide are dissolved in 200 parts by volume of methanol with gentle heating. After cooling, 400 parts by volume of 2.5-n methyl alcoholic potassium hydroxide is added and the product left to stand at 20° C. After 30–60 minutes the crystallisation of the resulting 2-methyl-4-amino-5-cyanopyrimidine sets in. After standing for 24–48 hours, the paste of crystals formed is sucked off and washed with a little methanol.

Example 4

140 parts by weight of amino-methylene-cyanoacetic ester are boiled under reflux for 15 minutes with a sodium-ethylate solution, prepared from 23 parts by weight of sodium, dissolved in 400 parts by volume of alcohol and 7.5 parts by weight of thioacetamide. Half of the alcohol used is then distilled off, double the volume of acetic ester added and the precipitate of sodium-hydrosulfide filtered off. The solution is concentrated almost to dryness, whereupon the residue crystallises after cooling. Solvent is removed by suction and the 2-methyl-4-amino-pyrimidine-5-carboxylic acid ester recrystallised from water. It forms white needles of melting point 120° C.

We claim:

1. In a process for the manufacture of 2-methyl-4-amino-pyrimidine derivatives the step of reacting thioacetic amide of the formula

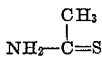

with an amino methylene derivative selected from the group consisting of amino methylene derivatives of the formula

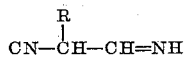

and the alkali salts thereof, R being selected from the group consisting of the nitrile and an esterified carboxylic radical, in an alkaline medium.

2. In a process for the manufacture of 2-methyl-4-amino-cyanopyrimidine, the step of reacting thioacetamide with amino methylene malonic nitrile in an alkaline medium.

3. In a process for the manufacture of 2-methyl-4-amino-cyanopyrimidine, the step of reacting thioacetamide with amino methylene malonic nitrile in the presence of alkali metal alcoholates.

4. In a process for the manufacture of 2-methyl-4-amino-cyanopyrimidine, the step of reacting thioacetamide with amino methylene malonic nitrile in the presence of sodium ethylate.

5. In a process for the manufacture of 2-methyl-4-amino-cyanopyrimidine, the step of reacting thioacetamide with amino methylene malonic nitrile alkali metal salts.

6. In a process for the manufacture of 2-methyl-4-amino-cyanopyrimidine the step of reacting thioacetamide with amino methylene malonic nitrile sodium salt.

7. In a process for the manufacture of 2-methyl-4-amino-pyrimidine-5-carboxylic acid ester, the step of reacting thioacetamide with amino methylene cyano acetic ester in an alkaline medium.

8. In a process for the manufacture of 2-methyl-4-amino-pyrimidine-5-carboxylic acid ester, the step of reacting thioacetamide with amino methylene cyano acetic ester in the presence of an alkali metal alcoholate.

9. In a process for the manufacture of 2-methyl-4-amino-pyrimidine-5-carboxylic acid ester the step of reacting thioacetamide with amino methylene cyano acetic ester in the presence of sodium ethylate.

HEINZ MORITZ WUEST.
MAX HOFFER.